(No Model.)
R. W. CAYCE.
TIRE TIGHTENER.
No. 476,870. Patented June 14, 1892.
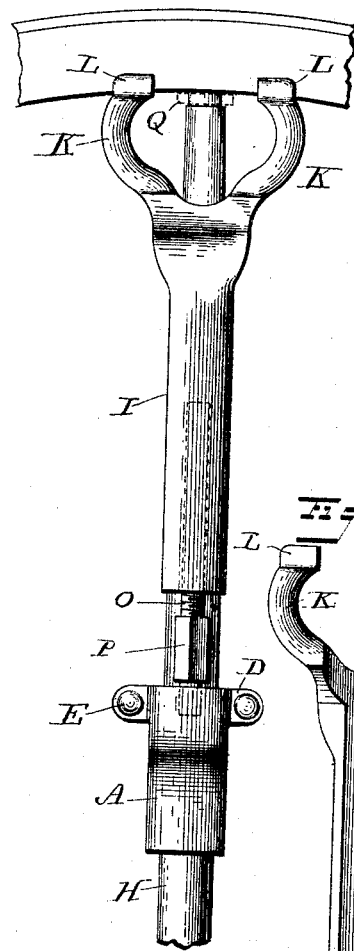
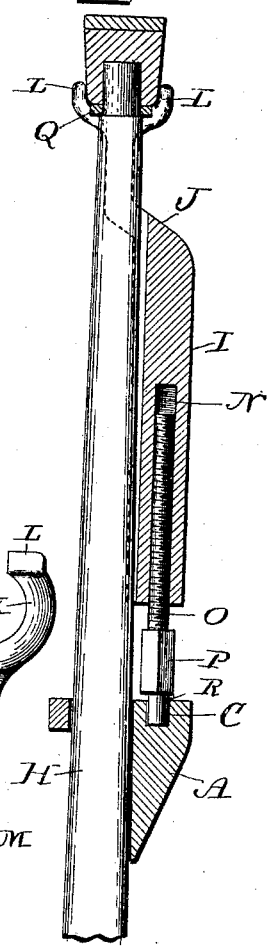
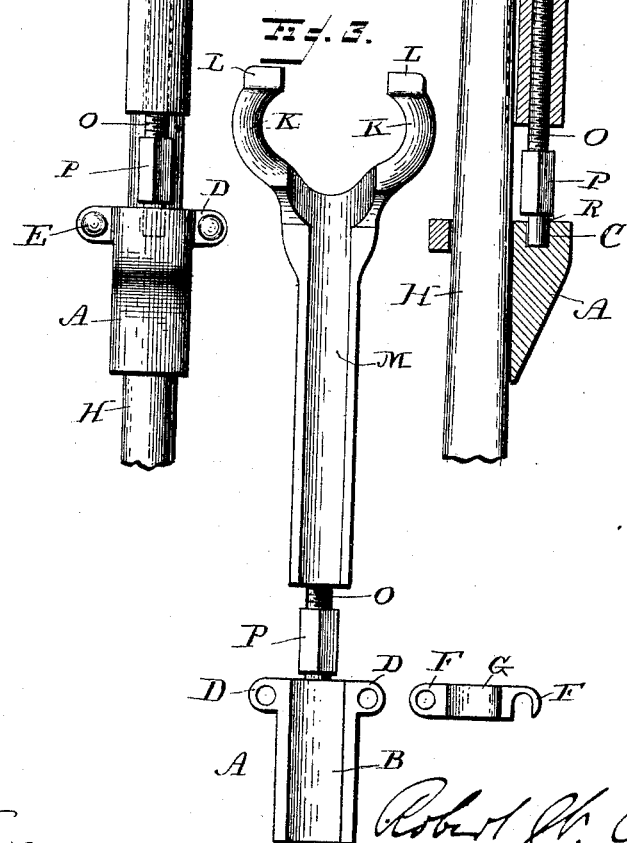
Witnesses
C. E. Hunt.
Alfred T. Gage.
Inventor
Robert W. Cayce,
by W. G. Henderson,
his Attorney.

UNITED STATES PATENT OFFICE.

ROBERT WALTER CAYCE, OF GATESVILLE, TEXAS.

TIRE-TIGHTENER.

SPECIFICATION forming part of Letters Patent No. 476,870, dated June 14, 1892.

Application filed September 14, 1891. Serial No. 405,653. (No model.)

*To all whom it may concern:*

Be it known that I, ROBERT WALTER CAYCE, a citizen of the United States, residing at Gatesville, in the county of Coryell and State of Texas, have invented certain new and useful Improvements in Tire-Tighteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in tire-tighteners; and it has for its object to improve the means for lifting the felly so as to permit the insertion of a washer between the felly and the spoke, so as to take up any slack or looseness that may have occurred, and thus tighten the tire on the felly.

To the accomplishment of the foregoing ends the invention consists in the construction and also in the combination of parts hereinafter particularly described and claimed, reference being had to the accompanying drawings, forming a part hereof, and in which—

Figure 1 is a side elevation of a portion of a tire and felly and spoke with my device applied thereto; Fig. 2, a cross-section through said parts with the spoke shown in full lines, and Fig. 3 a side view of the device looking at the same from the side next to the spoke.

In the drawings, the letter A designates a block composed of metal or other suitable material and formed with a recess B in one face thereof corresponding somewhat to the contour of the spoke, so as to hug closely to the same, and provided in its top face with a cavity C, designed to receive and hold in place the end of the screw hereinafter to be referred to. This block A is also formed with lateral ears D, which are perforated for the passage of the bolt. It is secured to the spoke by means of the bolts E, which pass through the perforated ears D and also through perforations in the ears F of a plate D, designed to bear against the opposite side of the spoke, so that when the bolts E, which may be provided with nuts, are tightened up the block A will be rigidly clamped to the spoke H. I prefer to have the perforation in one of the ears of the plate G open to the outside of the ear, so as to make that end of the plate in the form of a hook, although such construction is not essential to the invention. I also prefer to have the portion of the plate that lies against the spoke made slightly concave, as illustrated in Fig. 3, so as to fit closely to the spoke.

In connection with the block A, I employ what I will designate as a "jaw," which is indicated by the letter I. This jaw has its side which lies next to the spoke slightly concave and preferably of substantially the shape of the spoke in cross-section, so as to fit snugly thereto, in order that it may not move laterally when in operation. The upper portion of this jaw at the point J is extended or curved to one side and then bifurcated, so as to form two arms K, which will lie on opposite sides of the spoke, and the upper ends of these arms are forked, as shown at L, so that the forks will embrace the under face and the sides of the felly, as illustrated in Figs. 1 and 2 of the drawings, whereby the jaw is given a firm hold upon the felly. The concave face of the jaw is indicated by the letter M in Fig. 3 of the drawings. The jaw is also formed with a centrally-threaded aperture N, extending longitudinally of the jaw from its lower end upwardly and preferably terminating within the body of the jaw. This threaded aperture is intended to receive the threaded portion of an adjusting-screw O, which at a point beneath the lower end of the jaw is formed with an angular shoulder P, designed for the application of a suitable tool—for instance, a wrench—to turn the screw, so that the jaw may be raised or lowered to the extent desired. The portion of the screw below the angular shoulder P is plain and is stepped or fitted into the cavity C of the block A so that it is free to turn therein. It will be observed that by constructing and applying the adjusting-screw O as described the screw O has no longitudinal movement, although it moves the jaw longitudinally or vertically, whereby space is economized and the power to adjust the jaw is applied at the most convenient point.

In operation the device is applied as illustrated in Figs. 1 and 2 of the drawings and the adjusting-screw O turned so as to move the arm I upward, and thus lift the felly far enough to permit the insertion of a split-leather or other washer Q between the felly and the shoulder of the spoke at the point where the spoke enters the felly, so as to take up all slack, and thus tighten the tire upon the felly without the necessity of cutting and rewelding the tire.

The several parts of the device are simple to construct, exceedingly strong, and combine lightness with the application of the greatest leverage.

The device can also be applied by the most unskilled help and is quick of application and most efficient in operation.

I have described with particularity the details of construction of the several parts; but it is obvious that changes can be made therein without departing from the essential features of my invention.

Having described my invention and set forth its merits, what I claim is—

1. In a tire-tightener, the combination of a block adapted to be clamped to a spoke and formed with a cavity in its top face, a jaw adapted to bear against the under side of the felly on opposite sides of the spoke and formed with a threaded aperture extending from its lower end upwardly, and an adjusting-screw having a threaded portion fitting in the threaded aperture of the jaw and a plain portion turning freely in the cavity of said block and formed between the threaded and plain portions with an angular portion for the application of a tool to turn the screw to adjust the jaw without a vertical movement of the screw, substantially as and for the purposes set forth.

2. In a tire-tightener, the combination, with a block adapted to be clamped to a spoke and an adjusting-screw, of a jaw operated by said screw and having its upper portion extended or curved to one side and then bifurcated to form two arms, each of which is provided with a fork adapted to lie against the under face and the sides of the felly, substantially as and for the purposes set forth.

In testimony whereof I affix my signature in presence of two witnesses.

ROBERT WALTER CAYCE.

Witnesses:
  C. N. HARDY,
  J. C. CHRISMAN.